(12) United States Patent
Morita

(10) Patent No.: US 7,956,334 B2
(45) Date of Patent: Jun. 7, 2011

(54) RADIATION DOSIMETER FOR FLUID VERY SMALL SUBSTANCES, AND METHOD OF MEASURING RADIATION DOSE

(75) Inventor: Shigemitsu Morita, Machida (JP)

(73) Assignee: School Corporation, Azabu University Medicine Educational Institution, Sagamihara-shi (JP)

( * ) Notice: Subject to any disclaimer, the term of this patent is extended or adjusted under 35 U.S.C. 154(b) by 443 days.

(21) Appl. No.: 12/224,994

(22) PCT Filed: Mar. 9, 2007

(86) PCT No.: PCT/JP2007/054665
§ 371 (c)(1),
(2), (4) Date: Sep. 11, 2008

(87) PCT Pub. No.: WO2007/108332
PCT Pub. Date: Sep. 27, 2007

(65) Prior Publication Data
US 2009/0045352 A1     Feb. 19, 2009

(30) Foreign Application Priority Data

Mar. 13, 2006  (JP) .................................. 2006-067511

(51) Int. Cl.
*G01N 21/00* (2006.01)
(52) U.S. Cl. .................................................. 250/474.1
(58) Field of Classification Search ................ 250/474.1
See application file for complete search history.

(56) References Cited

U.S. PATENT DOCUMENTS 4,918,317 A * 4/1990 Hess et al. ................. 250/474.1

(Continued)

FOREIGN PATENT DOCUMENTS

JP         64-025086         1/1989

(Continued)

OTHER PUBLICATIONS

Sommer et al., 2004 UV Drinking Water Disinfection—Requirements, Testing and Surveillance: Exemplified by the Austrian National Standards M5873-1 and M5783-2.

*Primary Examiner* — David P Porta
*Assistant Examiner* — Mindy Vu
(74) *Attorney, Agent, or Firm* — Birch, Stewart, Kolasch & Birch, LLP

(57) ABSTRACT

Provided are a radiation dosimeter for fluid very small substances, which, in a radiation irradiation device for applying a radiation to a fluid very small substance in a fluid in a treatment chamber, can easily and accurately determine a dose distribution and/or minimum dose of a radiation applied to individual fluid very small substances, and a method of measuring a dose of a radiation applied to fluid very small substances using the dosimeter. In the radiation dosimeter for fluid very small substances, a microcapsule includes a radiation transmitting shell body and a radiation color development tautomeric photochromic solution contained within the shell. The microcapsule undergoes a change in color upon a change in color of the photochromic solution upon exposure to a radiation. The dose of the radiation and the color change level of the microcapsule have a quantitative relationship. Further, the particle diameter, which has a peak value in the particle diameter distribution of the microcapsule, is set to substantially the same diameter as the fluid very small substance as a dose measurement object. In the method of measuring the dose of a radiation applied to fluid very small substances, the radiation dosimeter for fluid very small substances is used.

15 Claims, 4 Drawing Sheets

U.S. PATENT DOCUMENTS

| | | | |
|---|---|---|---|
| 5,400,382 A * | 3/1995 | Welt et al. | 378/69 |
| 6,524,763 B1 * | 2/2003 | Kuroda et al. | 430/138 |
| 6,586,172 B1 * | 7/2003 | Gunn et al. | 435/2 |
| 7,101,497 B2 * | 9/2006 | Tanaka et al. | 252/586 |
| 2005/0239200 A1 * | 10/2005 | Beckwith et al. | 435/299.1 |

FOREIGN PATENT DOCUMENTS

| | | |
|---|---|---|
| JP | 09-503432 A | 4/1997 |
| JP | 2004-249207 | 9/2004 |
| WO | WO95/09814 | 4/1995 |

* cited by examiner

RADIATION DOSIMETER FOR FLUID VERY SMALL SUBSTANCES, AND METHOD OF MEASURING RADIATION DOSE

TECHNICAL FIELD

The present invention relates to a radiation dosimeter for fluid very small substances which is used in a radiation irradiation device for emitting radiation such as ultraviolet rays, X-rays, γ-rays, and electron beams (β-rays) for killing and inactivating various very small substances (fluid very small substances) which are generated and exist in a fluid (liquid or gas) treated in technical fields such as the water treatment industries (e.g., water supply and sewerage systems), the foodstuff industries, and the pharmaceutical industries, and flow with the movement of the fluid; and which can measure the dose distribution and/or the minimum dose of radiation with which the fluid very small substances have been irradiated or which has been absorbed by the fluid very small substances, and to a method of measuring the radiation dose using the radiation dosimeter.

BACKGROUND ART

For example, in water supply and sewerage systems, swimming pools, and large-sized baths to be targeted in the water treatment industries, recreation water such as scenic water, ballast water for marine vessels, potable water and juices to be targeted in the foodstuff industries; fluid medicines such as an injection, and liquid or syrup-like oral medicines to be targeted in the pharmaceutical industries, ultraviolet ray irradiation is performed as a measure for killing or inactivating pathogenic microorganisms and the like generated in or mixed into the liquid. In addition, in many foreign countries, irradiation of radioactive rays is also performed. As a device therefor, radiation irradiation devices such as an ultraviolet ray irradiation device and a radioactive ray irradiation device are used.

In such radiation irradiation devices, to understand the dose of radiation with which pathogenic microorganisms to be killed or inactivated have been actually irradiated is very important for designing the structure and formation of the irradiation device or determining the conditions of emitting radiation in such a manner as to kill or inactivate the pathogenic microorganisms and the like to an appropriate level. Thus, various methods have been proposed.

For example, JP 09-503432 A proposes a fluid treatment system equipped with an irradiation chamber having a radiation source towards a fluid to be treated; a radiation intensity measurement means for measuring the intensity of radiation; an exposure time measurement means for measuring a time during which a fluid a to be treated is exposed to radiation in the treatment chamber; and a radiation dose rate measurement means for measuring a dose rate of radiation with which a fluid to be treated has been irradiated based on the radiation intensity and the exposure time measured by the measurement device and the exposure period measurement means. However, in this method, the dose rate of radiation with which a fluid to be treated has been irradiated is merely measured based on the intensity of the radiation and the exposure time, and the dose of radiation with which each fluid very small substance such as pathogenic microorganisms, which flows with the movement of a fluid to be treated, has been irradiated cannot be measured.

Moreover, JP 2004-249207 A proposes an ultraviolet ray irradiation method in inactivation treatment of protozoans. More specifically, in a method of irradiating protozoans such as *Cryptosporidium*, which exist in water to be treated, with ultraviolet rays for inactivation, the turbidity state of water to be treated is measured; the measured value of this turbidity and the necessary ultraviolet ray dose preset in accordance with the turbidity are comparatively operated to calculate the current value of the ultraviolet ray dose relative to the turbidity; and the current quantity of a current allowed to flow into a ultraviolet ray germicidal lamp is controlled. However, also in this method, it is attempted to control the dose of ultraviolet rays in the inactivation treatment of protozoans by controlling the current value allowed to flow into a ultraviolet ray killing or the like based on the turbidity and the necessary ultraviolet ray dose preset in accordance with the turbidity. The dose of ultraviolet rays with which each protozoa, which flows with the movement of a fluid to be treated, has been irradiated cannot be measured.

Further, Sommer et al., 2004 "UV drinking water disinfection. —Requirement, Testing and Surveillance: Exemplified by the Austrian National Standards M5873-1 and M5873-2. Proc. $2^{nd}$ Asia Conf. UV Technol. Environ. Appl." has reported, as a method of evaluating the dose of ultraviolet rays emitted in an ultraviolet ray treatment chamber, a method of adding microorganism such as *Bacillus subtilis* and MS2 coliphage to water which flows into an ultraviolet treatment chamber, collecting the microorganisms which have passed through the treatment chamber to thereby calculate the inactivation rate and evaluate an average dose of ultraviolet rays with which the microorganisms, which have passed through the inside of the treatment chamber, have been irradiated. In this method using the organism dosimeter, however, the average dose of ultraviolet rays with which the microorganisms, which have passed through the inside of the treatment chamber, have been irradiated, can be measured. However, it is impossible to evaluate the distribution of the ultraviolet ray dose originating from both the distribution of the dose rate of ultraviolet rays in the treatment chamber and the distribution of the ultraviolet ray exposure time of each microorganism generated due to floating properties. There is a problem that there is no choice but to depend on the estimate of complicated computer simulation for the evaluation of the minimum dose in view of worst cases such as a development of short circuit in the treatment chamber.

Further, JP 64-25086 A proposes a radiation dosimeter containing a support having a layer of microcapsules on the surface thereof, in which the microcapsules contain a wall and an internal phase of a solution of a radiochromic dye, and upon exposure to radiation, the radiochromic dye changes the color or shade and density, and describes that the radiation dosimeter is supplied in the form of single sheets or rolls, and is used as a digital-type or analog-type dosimeter in the fields of foodstuff industries and pharmaceutical industries. However, in this method, the microcapsules merely serve as a shell body for holding the solution of radiochromic dye on the support surface, and the radiation dosimeter is supplied in the form of single sheets or rolls. Thus, with respect to the various fluid very small substances which flow in a liquid with the movement of the fluid, the dose distribution of radiation with which each fluid very small substance has been irradiated or which has been absorbed by each fluid very small substance and/or the minimum dose of radiation cannot be measured.

Patent Document 1: JP 09-503432 A
Patent Document 2: JP 2004-249207 A
Patent Document 3: JP 64-25086 A
Non-patent Document 1: Sommer et al., 2004 "UV drinking water disinfection. —Requirement, Testing and Surveillance: Exemplified by the Austrian National Standards M5873-1 and M5873-2. Proc. 2nd Asia Conf. UV Technol. Environ. Appl."

DISCLOSURE OF THE INVENTION

Problems to be Solved by the Invention

Incidentally, when attention is focused on the water treatment in water supply systems, the development of infectious diseases through tap water is remarkably reduced due to the spread of modern water supply systems and the development of disinfection techniques. However, even in the advanced nations in which health management is progressed, waterborne infections due to pathogenic microorganisms having resistance against chlorine has frequently occurred. Mentioned as such pathogenic microorganisms are protozoans such as *Cryptosporidium* and *Giardia*, viruses such as Hepatitis A virus and Norovirus; etc. In particular, cysts and oocysts of protozoans generally have strong disinfection resistance, and, particularly, *Cryptosporidium parvum* oocyst exhibits strong resistance against chlorine. For example, 400,000 or more people were infected in Milwaukee in 1993, and nearly 9,000 people were infected in Ogose Town, Saitama Prefecture, Japan, in 1996, and, under the present situation, it is impossible to estimate when such mass infection occurs.

It is considered that, ultraviolet ray disinfection using an ultraviolet ray irradiation device or a radioactive ray disinfection using a radioactive ray irradiation device is effective for the pathogenic microorganisms such as *Cryptosporidium* and is effective as a complement technique for chlorine disinfection. Thus, when potable water is disinfected, for example, with an ultraviolet ray irradiation device, a distribution inevitably arises in the dose of ultraviolet rays with which pathogenic microorganisms such as *Cryptosporidium*, which move with potable water in the potable water are irradiated, from the best case in which the pathogenic microorganisms slowly pass through a route near a ultraviolet ray lamp to receive a large amount of ultraviolet rays in the ultraviolet ray treatment chamber to the worst case in which the pathogenic microorganisms passes in a short period of time through a route apart from the ultraviolet ray lamp to receive a very slight amount of ultraviolet rays in the ultraviolet ray treatment chamber. The distribution of the ultraviolet ray dose varies with the structures and formations of ultraviolet irradiation devices; treatment conditions; the shapes and dimensions of pathogenic microorganisms; etc. Moreover, the ultraviolet ray irradiation dose required for inactivation also varies with the types and infectivity of pathogenic microorganisms. Therefore, in order to evaluate efficacy of disinfection of an ultraviolet ray irradiation device to the pathogenic microorganisms which exist or are generated in potable water and the like, it is indispensable to know the distribution of the dose of ultraviolet rays with which each pathogenic microorganism to be targeted is irradiated and know the minimum dose of ultraviolet rays with which pathogenic microorganisms to be targeted are irradiated in the worst case.

However, by conventionally-used ultraviolet ray dosimeters or methods of measuring the ultraviolet ray dose for use in the evaluation of this type of ultraviolet ray irradiation device, the dose distribution and/or the minimum dose of ultraviolet rays with which such pathogenic microorganism are irradiated cannot be measured. Unless hydrodynamic evaluation is carried out by a complicated computer simulation, the dose distribution and/or the minimum dose of ultraviolet rays with which the pathogenic microorganisms are irradiated cannot be calculated.

Similarly, by conventionally-used radioactive ray dosimeter or a method of measuring the radioactive ray dose for use in the evaluation of this type of radioactive ray irradiation device, the dose distribution and/or the minimum dose of radioactive rays with which such pathogenic microorganism are irradiated cannot be measured. Unless hydrodynamic evaluation is carried out by a complicated computer simulation, the dose distribution and/or the minimum dose of radioactive rays with which the pathogenic microorganisms are irradiated cannot be calculated.

Under the above-described circumstances, development of a dosimeter for radiation such as ultraviolet rays and radioactive rays, the dosimeter being capable of simply and accurately measuring the dose distribution and/or the minimum dose of ultraviolet rays and radioactive rays, and development of a method of measuring the dose using the dosimeter have been demanded.

The inventors of the present invention conducted extensive research from such a viewpoint. As a result, the inventors of the present invention have found that, in a radiation dosimeter which includes a microcapsule formed of a shell body and a photochromic solution, which contains a photochromic compound and is contained in the shell body, and in which microcapsule the radiation dose and the color change level of the microcapsule have a quantitative relationship, by adjusting the particle diameter showing the peak value in the particle diameter distribution of the microcapsules to be substantially the same as the dimension diameter of fluid very small substances serving as a dose measurement target, the radiation dosimeter shows substantially the same fluid behavior as that of fluid very small substances in the fluid when introduced into a fluid. Moreover, the inventors have found that by measuring the color change level of the radiation dosimeter, the dose distribution and/or the minimum dose of radiation with which each fluid very small substance has been irradiated can be easily and certainly determined with the radiation irradiation device. Based on these findings, the present invention has been accomplished.

Therefore, an object of the present invention is to provide a radiation dosimeter for fluid very small substances, the dosimeter being capable of easily and accurately determining the dose distribution and/or the minimum dose of radiation with which each fluid very small substance has been irradiated, in a radiation irradiation device which introduces a fluid into a treatment chamber, and irradiates the fluid in the treatment chamber with radiation to thereby irradiate the fluid very small substances with radiation in the fluid.

Moreover, another object of the present invention is to provide a method of measuring the radiation dose to fluid very small substances, the method being capable of determining the dose distribution and/or the minimum dose of radiation with which each fluid very small substance has been irradiated or which has been absorbed by each fluid very small substance, in a radiation irradiation device which irradiates a fluid with radiation in a treatment chamber using such a radiation dosimeter for fluid very small substances.

Means for Solving the Problems

More specifically, the present invention relates to a radiation dosimeter for fluid very small substances including a microcapsule including a radiation transmitting shell body and a photochromic solution, which is obtained by dissolving a radiation color development tautometric photochromic compound in a solvent and is contained in the shell body, in which the photochromic solution undergoes a change in color upon irradiation of radiation; the radiation dose and the color change level of the microcapsule have a quantitative relationship; and the particle diameter showing the peak value in the particle diameter distribution of the microcapsule is adjusted to be substantially the same as the dimension diameter of the fluid very small substances serving as a dose measurement target. Preferably, the present invention is a radiation dosimeter for fluid very small substances, in which the particle diameter R of the microcapsule is in the range of $0.5r \leqq R \leqq 1.5r$ relative to the dimension diameter r of the fluid very small substance serving as a dose measurement target. More preferably, the present invention is a radiation dosimeter for fluid very small substances in which the particle diameter of the microcapsule is substantially the same as the dimension diameter of the fluid very small substance.

The present invention relates to a method of measuring a radiation dose to fluid very small substances including: measuring a dose of radiation with which fluid very small substances have been irradiated by a radiation dosimeter in a radiation irradiation device which introduces a fluid into a treatment chamber equipped with a radiation irradiation means; and irradiates the fluid with radiation in the treatment chamber by the radiation irradiation means to thereby irradiate the fluid very small substances in the fluid; in which the radiation dosimeter includes a microcapsule which includes a radiation transmitting shell body and a photochromic solution obtained by dissolving a radiation color development tautometric photochromic compound in a solvent and contained in the shell body; the microcapsule undergoes a change in color upon a change in color of the photochromic solution by irradiation of radiation; in the microcapsule, a color change level thereof has a quantitative relationship with a radiation dose; and measuring a color change level of each radiation dosimeter collected from an outlet of the treatment chamber, the radiation dosimeter being introduced into the treatment chamber of the radiation irradiation device from an inlet port of the treatment chamber, and determining a dose distribution and/or a minimum dose of radiation with which each fluid very small substance has been irradiated by the radiation irradiation means.

In the present invention, basically, the photochromic solution contained in the microcapsule may undergo a change in color, while having a predetermined quantitative relationship, upon irradiation of radiation such as ultraviolet rays, X-rays, γ-rays, and electron beams (β-rays) according to the dose of the radiation, and may be developed as a color change level of the microcapsule (change level of a color) as a result. The radiation color development compatible photochromic compound and the solvent for forming the photochromic solution can be selected from the substances described below, and used, for example. Here, with respect to the quantitative relationship between the irradiation dose or absorbed dose of radiation and the color change level of the microcapsule, the relationship may be established under a fixed relationship and the color change level of the microcapsule (e.g., absorbance) is specified when the irradiation dose or the absorbed dose of radiation is known, and, on the contrary, the irradiation dose or the absorbed dose of radiation may be specified when the color change level of the microcapsule is known. The relationship may be or not may be a linear relationship, and, moreover, the relationship may be developed by determining a calibration curve beforehand.

Moreover, it is preferable that the quantitative relationship between the radiation dose and the color change level of the microcapsule exist in a broad range as much as possible with respect to the radiation dose. However, the quantitative relationship is necessary to exist in the range including at least the minimum dose of the required radiation for the target fluid very small substances. For example, when the fluid very small substance is a pathogenic microorganism and the dose of radiation required for inactivation thereof is experimentally calculated, the quantitative relationship between the radiation dose and the color change level of the microcapsule needs to exist in the range including at least the required dose value. The quantitative relationship between the radiation dose and the color change level of the microcapsule may exist in the range of preferably 0.5 times or lower, and more preferably 0.3 times or lower the required dose value, including the required dose value. Further, the quantitative relationship between the maximum dose and the color change level of the microcapsule in a radiation irradiation means needs to exist in the range including at least the maximum dose value, and may exist in the range of preferably 1.5 times or more, and more preferably twice or more the maximum dose value, including the maximum dose value. For example, when the pathogenic microorganism as the fluid very small substances is *Cryptosporidium*, a dose value of ultraviolet rays required for 99.9% inactivation thereof is about 10 mJ/cm$^2$, and the maximum dose of ultraviolet rays emitted by an ultraviolet ray irradiation means is set to 80 mJ/cm$^2$. Thus, the quantitative relationship may be established between the ultraviolet ray dose and the color change level of the microcapsule in the range including the required dose of ultraviolet rays and the maximum dose of ultraviolet rays emitted by an ultraviolet ray irradiation means (not less than 5 mJ/cm$^2$ and not more than 120 mJ/cm$^2$ and preferably not less than 3 mJ/cm$^2$ and not more than 160 mJ/cm$^2$).

The color development properties when a radiation color development compatible photochromic compound is irradiated with radiation vary with combinations with solvents forming photochromic solutions. It is preferable that the color change level per unit dose of the emitted radiation be relatively high and that a relatively broad quantitative relationship and preferably a linear quantitative relationship be established between the emitted radiation dose and the color change level of the microcapsule. For example, the following can be mentioned: spiropyranes such as 1-(2-hydroxyethyl)-3,3-dimethylindolino-6'-nitrobenzopyrylospiran, 1,3,3-trimethylindolinobenzopyrylospiran, 1,3,3-trimethylindolino-6'-bromobenzopyrylospiran, 1,3,3-trimethylindolino-8'-methoxybenzopyrylospiran, 1,3,3-trimethylindolino-β-naphthopyrylospiran, 1,3,3-trimethylindolinonaphthospirooxazine, and 1,3,3-trimethylindolino-6'-nitrobenzopyrylospiran.

Further, mentioned are diarylethenes such as cis-1,2-dicyano-1,2-bis(2,4,5-trimethyl-3-thienyl)ethane, 1,2-bis[2-methylbenzo[b]thiophen-3-yl]-3,3,4,4,5,5-hexafluoro-1-cyclopentene, 2,3-Bis(2,4,5-trimethyl-3-thienyl)maleic anhydride, and 2,3-bis(2,4,5-trimethyl-3-thienyl)malemide; and viologens such as 4,4'-bipyridyl, 1,1'-bis(2,4-dinitrophenyl)-4,4'-bipyridinium dichloride, 1,1'-dibenzyl-4,4'-bipyridinium dichloride, 1,1'-di-n-heptyl-4,4'-bipyridinium dibromide, 1,1'-dimethyl-4,4'-bipyridinium dichloride, 1,1'-di-n-octyl-4,4'-bipyridiniumdibromide, and 1,1'-diphenyl-4,4'-bipyridinium dichloride.

As other substances, the following industrial inks are mentioned: 10-benzoyl-N,N,N',N'-tetramethyl-10H-phenothiazine-3,7-diamine (abbreviated as BLMB), 4,4',4"-tris(dimethylamino) triphenylmethan (abbreviated as LCV), 2-dibenzylamino-6-diethylaminofluoran, 2-(2-chloroanilino)-6-dibutylaminofluoran, Azobenzene, 2,5-Norbornadiene, and Thioindigo. These photochromic compounds can be used singly, or two or more kinds may be used in combination as required.

More preferably, from the viewpoint of handling, the photochromic compound may have irreversible color change properties with which the photochromic compound is not decolorized when irradiated with visible rays and/or heated. When the photochromic compound after color change is stable against the irradiation of visible rays and/or heat, etc., a radiation dosimeter containing such a photochromic compound can be conveyed to a location where a measurement means such as a flow cytometer for measuring the color change level of the radiation dosimeter is disposed, and the color change level can be measured even when such a measurement means is not disposed near the radiation irradiation device serving as a measurement target. Therefore, it is not necessary to provide a measurement means such as a flow cytometer at each place in which the radiation irradiation device is provided. Further, it is preferable that the photochromic compound dissolve in a water-insoluble solvent from the viewpoint of producing a microcapsule.

The solvent for forming a photochromic solution may dissolve the photochromic compound to form a photochromic solution. Since the color change properties of the obtained photochromic solution, as a result, the color change properties of a microcapsule, vary depending on the combination with the photochromic compound, the solvent is suitably selected according to the type of the photochromic compound to be used or the type of radiation, and used. Specific examples of the solvent include aromatic compounds such as benzene, toluene, and xylene; aromatic aralkyl alcohols such as benzyl alcohol; ketones such as 2-butanone and 4-methyl-2-pentanone; acetates such as ethyl acetate and butyl acetate; water-insoluble solvents such as carboxylates (e.g. methyl methacrylate); lower aliphatic alcohols such as methanol, ethanol, and 2-propanol; lower aliphatic ethers such as diethyl ether; lower aliphatic ketones such as acetone, methyl ethyl ketone, and methyl isobutyl ketone; lower aliphatic nitrites such as acetonitrile; sulfoxides such as dimethyl sulfoxide; and water-soluble solvents such as deionized water. These solvents can also be used singly, or two or more kinds may be used in combination as required.

The combination of a photochromic compound and a solvent in producing a photochromic solution can be experimentally determined by dissolving a photochromic compound in a solvent to prepare a photochromic solution, irradiating the obtained photochromic solution with radiation to measure the color development intensity, and then conducting a color development/decolorization experiment for evaluating whether the photochromic solution is decolorized when irradiated with visible rays or heated.

It is preferable, from the viewpoint of handling, that the photochromic solution have irreversible color change properties with which the photochromic solution is not decolorized when irradiated with visible rays and/or heated after the photochromic solution has undergone a change in color when irradiated with radiation. Particularly preferable are, for example, a solution in which 10-benzoyl-N,N,N',N'-tetramethyl-10H-phenothiazine-3,7-diamine (BLMB) is dissolved in a solvent such as toluene, 2-propanol, methanol, methyl ethyl ketone (MEK), and dimethyl sulfoxide (DMSO) in a proportion ranging from 0.01 to 2 wt %, and preferably 0.1 to 1 wt % and a solution in which 4,4',4"-tris(dimethylamino) triphenylmethan (LCV) is dissolved in a solvent such as toluene, 2-propanol, and benzyl alcohol in a proportion ranging from 0.01 to 2 wt %, and preferably in a proportion ranging from 0.1 to 1 wt %. Further, from the viewpoint of capsule formation properties, particularly preferable are a 0.1 to 1 wt % toluene solution of BLMB and a 0.1 to 1 wt % 2-propanol solution of LCV. The concentration of the photochromic compound in the photochromic solution is suitably determined considering the color development properties and decolorization properties depending on a measurement target dose region.

Further, for a capsule film material for forming the shell body of the microcapsule in which the above-mentioned photochromic solution has been contained, conventionally-known various kinds of materials can be used. Since the color change level, due to the irradiation of radiation, of the photochromic solution contained in the shell body is observed through the shell body, the capsule film material may have at least radiation transmitting properties and have visible ray transmitting properties so that the photochromic solution which has undergone a change in color can be observed from the outside of the shell body, and preferably, the material is excellent in transparency.

Mentioned as the capsule film material are, for example, gelatin, a urea resin, a melamine resin, a urethane resin, and a polyurea resin, and the material can be suitably selected depending on the relationship with the above-mentioned photochromic solution. From the viewpoint of ultraviolet ray transmitting properties, storage stability, etc., a urea-formaldehyde resin or gelatin are preferable, and a urea-formaldehyde resin is particularly preferable.

There is no limitation on the method of producing a microcapsule serving as the radiation dosimeter of the present invention using the photochromic solution and the capsule film material. Conventionally-known production methods, e.g., a coacervation method, an interfacial-polymerization method, an in-situ method, etc., can be mentioned. The production method can be suitably selected according to the types of the photochromic solution, the capsule film material, etc., to be used.

In the present invention, the microcapsule used as a radiation dosimeter needs to show substantially the same fluid behavior as the fluid behavior of fluid very small substances to be measured which exist in a fluid when the microcapsule is introduced into the fluid. Therefore, the particle diameter showing the peak value in the particle diameter distribution needs to be adjusted to be substantially the same dimension diameter as the dimension diameter of the fluid very small substance serving as a dose measurement target. The "particle diameter showing the peak value in the particle size distribution" of the microcapsule as used herein refers to the dimension of the particle diameter of the particle showing the peak value of the particle number in the particle diameter distribution, particle diameter (axis of abscissa)–particle number (axis of ordinate), of the microcapsule. Besides, the "substantially the same dimension diameter as the dimension diameter of the fluid very small substance" as used herein refers to a case where the particle diameter is in the range of ±10% of the dimension diameter of the fluid very small substance and to a case where, when there is a range in the dimension diameter of the fluid very small substance, the particle diameter is within the range.

In order to increase the resolution as a radiation dosimeter of the microcapsule of the present invention, it is preferable that the particle diameter R of the microcapsule be within the range of $0.5r \leq R \leq 1.5r$ relative to the dimension diameter r of the fluid very small substance serving as a dose measurement target. Only from the viewpoint of the resolution of the radiation dosimeter, it is more preferable that all the particle diameters of the microcapsule be the same. The resolution as the radiation dosimeter becomes higher as the particle diameter R of the microcapsule approaches the dimension diameter r of the fluid very small substance. Thus, the production of the microcapsules becomes difficult, and the production cost increases. Therefore, excluding the case where a high accuracy is specially required, the particle diameter R of the microcapsule may be within the range of $0.5r \leq R \leq 1.5r$.

For example, when *Cryptosporidium* (4 to 7 μm), which is a chlorine-resistant microorganism, is targeted as a fluid very small substance, the dimension is not less than about 2 μm and not more than about 10 μm, more preferably not less than 3 μm and not more than 8 μm. When *Giardia* (8 to 12 μm) is targeted, the dimension is not less than about 4 μm and not more than about 18 μm, and preferably not less than 6 μm and not more than 14 μm. Further, when both *Giardia* and *Cryptosporidium* are targeted, the dimension may be within the range including the dimension diameters thereof, e.g., not less than about 2 μm and not more than about 18 μm, preferably not less than 3 μm and not more than 14 μm, and more preferably not less than 4 μm and not more than 12 μm. Similarly, when *Entamoeba hystolytica* is targeted as the fluid very small substance, for example, the dimension of the microcapsule may be adjusted to about 10 to 20 μm. When *Naegleria fowleri* is targeted, the dimension of the microcapsule may be adjusted to about 7 to 10 μm. When *Echinococcus* spp. is targeted, the dimension may be adjusted to about 30 to 38 μm.

As described above, there is a distribution in the dimension diameter r of the fluid very small substance serving as a dose measurement target, it is preferable that the particle diameter R of the microcapsule be within the range including the range from the minimum particle diameter of the fluid very small substance to the maximum particle diameter thereof. The radiation dosimeter containing a microcapsule whose particle diameter R is made closer to the dimension diameter r of the fluid very small substance shows the same or near fluid behavior, in a fluid, as that of the fluid very small substance serving as a dose measurement target, and a more accurate radiation dose distribution and/or the minimum dose can be measured and determined.

As a method of obtaining such a microcapsule whose dimension is near the dimension of the fluid very small substance serving as a dose measurement target, a microcapsule production method itself may be devised, e.g., controlling the stirring conditions in an emulsification stirring method to adjust the particle diameter of a microcapsule to be produced. As a simple method, the produced microcapsule may be fractionated according to the dimension of the required particle diameter R. As the fractionation method, known methods such as a cell-sorting flow cytometry can be mentioned, for example.

There is no limitation on a method of measuring the dose of radiation (average dose, dose distribution, minimum dose) with which the fluid very small substances have been irradiated using the radiation dosimeter containing the microcapsule thus obtained in the radiation irradiation device which emits radiation such as ultraviolet rays, X-rays, γ-rays, and electron beams (β-ray). As a method of measuring the dose distribution and/or the minimum dose of radiation with which the fluid very small substances have been irradiated, the following methods are preferably mentioned. The following description will be given to a case where the dose distribution and/or the minimum dose are/is measured. It is a matter of course that the average dose is also measurable.

More specifically, as illustrated in FIG. 1, for example, the method of measuring the radiation dose is a method which involves introducing a fluid into a treatment chamber 2 having a radiation irradiation means 1 from an inlet port 3 of the treatment chamber 2, and then delivering the fluid from an outlet 4 of the treatment chamber 2. In the method, during the above process, the fluid is irradiated with radiation in the treatment chamber 2 by the radiation irradiation means 1, and the dose of the radiation which is used for a radiation irradiation device which irradiates the fluid very small substances in the fluid with radiation and with which each fluid very small substance has been actually irradiated is measured by radiation dosimeters 5. The method involves introducing the radiation dosimeters 5 each containing a microcapsule into the treatment chamber 2 from the inlet port 3; collecting the radiation dosimeters 5 which have passed through the inside of the treatment chamber 2 from that outlet 4 with a membrane filter, microfiltration membrane, ultrafiltration membrane, etc.; and measuring the color change level of each of the collected radiation dosimeters 5 with a color change level measurement means 6 to thereby determine the dose distribution and/or the minimum dose of radiation with which each fluid very small substance has been irradiated by the radiation irradiation means 1.

Here, as the radiation irradiation device to which the method of measuring the radiation dose of the present invention is applied, any radiation irradiation devices are acceptable insofar as the treatment chamber 2 has the inlet port 3 for introducing a fluid, the outlet 4 for discharging the fluid, and the radiation irradiation means 1 for emitting radiation such as an ultraviolet lamp, a source of γ-rays, and an electron beam accelerator is provided inside the treatment chamber 2. Moreover, the treatment chamber 2 may be any types, e.g., a batch type or a circulation type.

There is also no limitation on the color change level measurement means 6 for measuring the color change level of each of the radiation dosimeters collected by the above-mentioned method. Preferably mentioned are a flow cytometer and the like, which irradiates each of the collected radiation dosimeters 5 with an He—Ne laser 7, and measures the scattered lights 8*a*, 8*b*, and 8*c*, to thereby determine the color change level from the intensity of each of the scattered lights 8*a*, 8*b*, and 8*c*.

Moreover, with respect to the measurement of the color change level of the radiation dosimeters by the color change level measurement means 6, when the photochromic solution contained in the microcapsule forming the radiation dosimeter has reversible color change properties with which the photochromic solution is likely to decolorize when the solution is irradiated with visible rays and/or heated, for example, it is preferable that the radiation dosimeters 5 collected from the outlet 4 of the treatment chamber 2 of the radiation irradiation device can be promptly measured at the outlet 4 of the treatment chamber 2 or in the vicinity thereof. When the photochromic solution has irreversible color change properties with which the photochromic solution is not decolorized when the solution is irradiated with visible rays and/or heated, the radiation dosimeters 5 collected from the outlet 4 of the treatment chamber 2 of the radiation irradiation device may be conveyed to another facility having the color change level measurement means 6 for measurement.

Effects of the Invention

According to the radiation dosimeter for fluid very small substances of the present invention and the method of measuring the radiation dose using the dosimeter of the present invention, the particle diameter showing the peak value in the particle diameter distribution of the microcapsules forming the radiation dosimeter is adjusted to be substantially the same as the dimension diameter of the fluid very small substances serving as a dose measurement target. When the radiation dosimeters are introduced into the fluid, the radiation dosimeters show substantially the same fluid behavior as that of the fluid very small substances. Thus, by introducing the radiation dosimeters into the treatment chamber of the radiation irradiation device from the inlet port of the treatment chamber, collecting them at the outlet of the treatment chamber, and then measuring the color change level of the collected respective radiation dosimeters, the dose distribution and/or the minimum dose of radiation with which each fluid very small substance has been irradiated by the radiation irradiation device can be easily and certainly determined. Therefore, for example, when applied to an ultraviolet ray irradiation device used for disinfecting pathogenic microorganisms in water supply systems, the radiation dosimeters show substantially the same fluid behavior, in the tap water of the treatment chamber of the radiation irradiation device, as that of the pathogenic microorganisms to be disinfected based on the fact that the particle diameter of the microcapsule forming the radiation dosimeter is adjusted to be substantially the same as the diameter of pathogenic microorganisms to be killed or inactivated. Therefore, by measuring the color change level of the respective radiation dosimeters collected at the outlet of the treatment chamber, the dose distribution and/or the minimum dose of ultraviolet rays with which each pathogenic microorganism is irradiated can be easily and certainly determined with a ultraviolet ray irradiation device.

BRIEF DESCRIPTION OF THE DRAWINGS

FIG. 8(a) illustrates the results measured in a mixed system, and FIG. 8(b) illustrates the results measured in a static system.

BEST MODE FOR CARRYING OUT THE INVENTION

Hereinafter, the radiation dosimeter for fluid very small substances of the present invention and the method of measuring the radiation dose using the same will be specifically described with reference to Examples.

Example 1

Preparation of BLMB Microcapsule (BLMB Ultraviolet Ray Dosimeter)

Using BLMB (10-benzoyl-N,N,N',N'-tetramethyl-10H-phenothiazine-3,7-diamine) as a photochromic compound, 1 g of BLMB was dissolved in 100 g of toluene to prepare photochromic solution (BLMB-1 wt % toluene solution).

The obtained photochromic solution (BLMB-1 wt % toluene solution) was introduced into a batch-type ultraviolet ray irradiation device. The photochromic solution was irradiated with ultraviolet rays of 5 to 120 mJ/cm$^2$. Thereafter, the absorbance at 660 nm was measured by an absorptiometer (UV-1700, manufactured by Shimadzu Corp.), and the relationship between the ultraviolet ray dose (mJ/cm$^2$) and the absorbance (O.D.) was analyzed.

Figure 1:
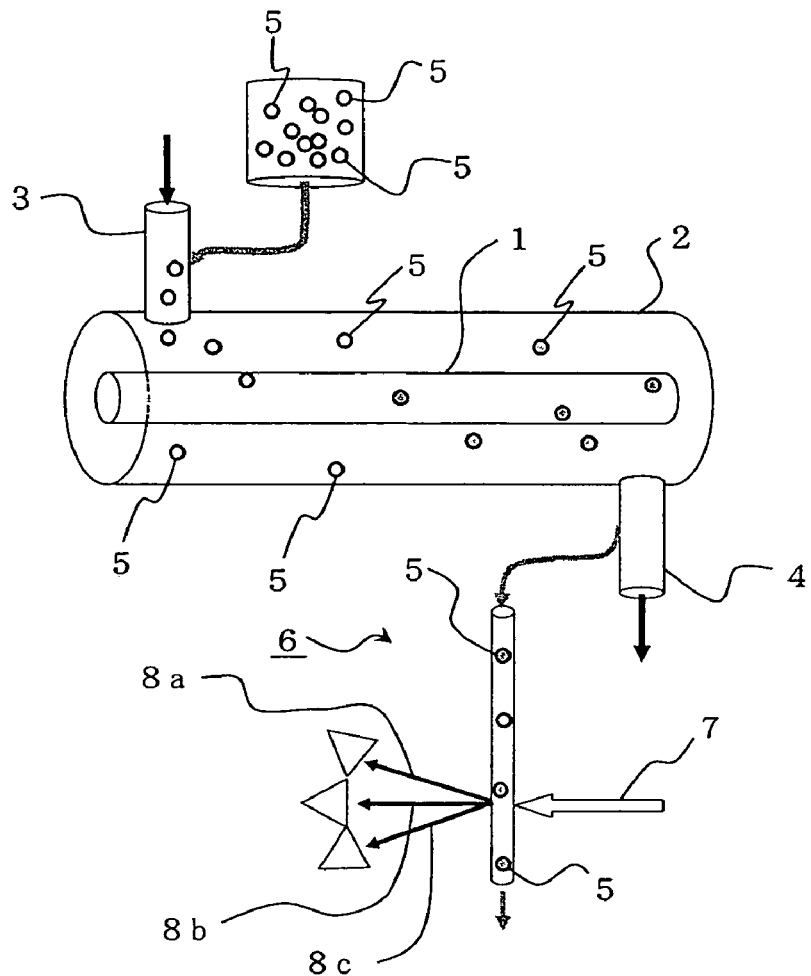
FIG. 1 is an explanatory view for describing a method of measuring the radiation dose using a radiation dosimeter for fluid substances of the present invention.
Figure 2:
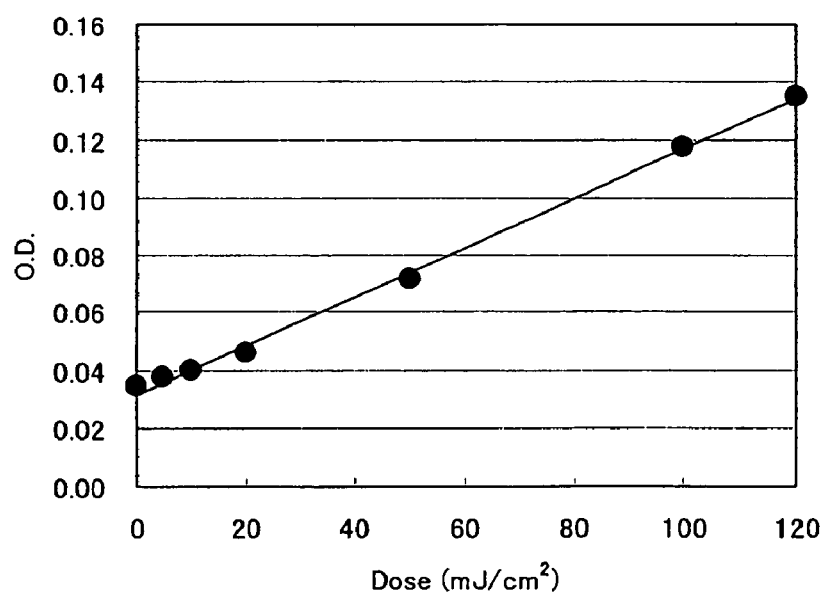
FIG. 2 is a graph illustrating the relationship between the ultraviolet ray dose (mJ/cm$^2$) of a photochromic solution (BLMB-1 wt % toluene solution) obtained in Example 1 and the absorbance (O.D.) at 660 nm.

The results are shown in FIG. 2.

As is clear from the results shown in FIG. 2, the absorbance of the photochromic solution (BLMB-1 wt % toluene solution) linearly increases with increase in the ultraviolet ray dose, and a high correlation was observed between the ultraviolet ray dose and the absorbance.

Next, 5 g of urea and 0.2 g of resorcinol were added to and dissolved in 70 g of 5 wt %-aqueous solution of an ethylene-maleic anhydride copolymer. The pH of the solution was adjusted to 3.2 with a 15 wt %-sodium hydroxide solution. To 75 g of the aqueous solution, 60 g of the above-mentioned photochromic solution (B LMB-1 wt % toluene solution) was added while stirring with a homogenizer. Then, the mixture was emulsified and dispersed in such a manner that the particle diameter of the photochromic solution was adjusted to 10 μM.

To the emulsified dispersion thus obtained, 9 g of 37 wt %-formaldehyde solution and 8 g of water were added. The mixture was heated while stirring at 55° C. for 2 hours, and then cooled to 20° C. The pH of the resultant was adjusted to 4.0 with a 5 wt %-sodium hydroxide solution to thereby prepare BLMB ultraviolet ray dosimeters each formed of a microcapsule in which the photochromic solution was a BLMB-1 wt % toluene solution and the capsule film material was a urea-formaldehyde resin. The particle diameter distribution of the microcapsules produced by the method was 1.0 to 30 μm (90% value).

[Measurement of Color Change Level of BLMB Microcapsule (BLMB Ultraviolet Ray Dosimeter)]

Next, the prepared BLMB ultraviolet ray dosimeters were introduced into a batch-type ultraviolet ray irradiation device, and (a) the BLMB ultraviolet ray dosimeters were not irradiated with ultraviolet rays or (b) the BLMB ultraviolet ray dosimeters were irradiated with ultraviolet rays of 100 mJ/cm$^2$. Thereafter, the BLMB ultraviolet ray dosimeters were collected and were measured for the side scattered light (SSC) with a flow cytometer (COULTER EPICS ALTRA HyPerSort System Flowcytometer, manufactured by Beckman Coulter, Inc.). Then, the color change level of each BLMB ultraviolet ray dosimeter was determined from the histogram.

Figure 3:
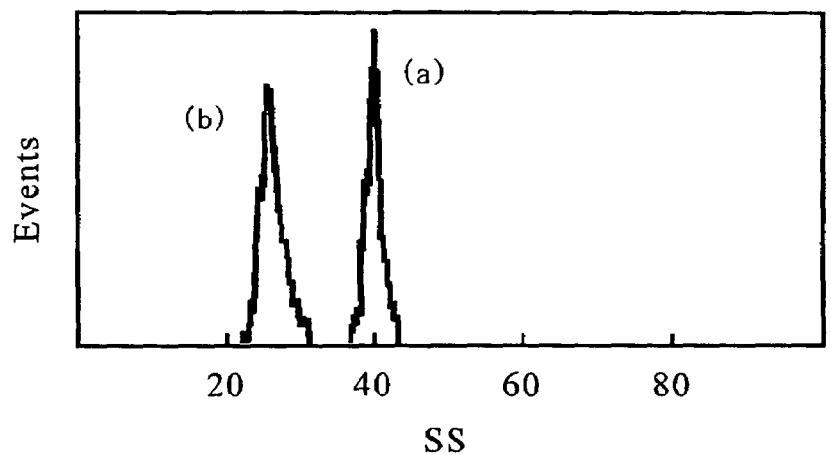
FIG. 3 is a graph illustrating the relationship between the SS channel of a BLMB ultraviolet ray dosimeter obtained in Example 1 and the number of particles (discrete value) in each channel.

The results are shown in FIG. 3.

In FIG. 3, the SS channel plotted on the axis of abscissas is proportional to the color development intensity of the BLMB ultraviolet ray dosimeter, and the axis of ordinate represents the number of particles (discrete value) in each channel. As is clear from the relationship between the SS channel and the discrete value shown in FIG. 3, the SS channel is shifted to the low side as the ultraviolet ray dose increases (see (a) and (b) in FIG. 3) with respect to the histogram of the discrete value. A high correlation is observed between the peak channel of the discrete value and the ultraviolet ray dose.

Example 2

In the same manner as in Example 1 except the stirring rate, BLMB ultraviolet ray dosimeters each formed of a microcapsule in which the photochromic solution was a BLMB-1 wt % toluene solution and the capsule film material was a urea-formaldehyde resin were prepared. The particle diameter distribution of the microcapsules produced by the method was 1.0 to 45 μm (90% value).

Example 3

Preparation of LCV Microcapsule (LCV Radiation Dosimeter)

A photochromic solution containing an LCV-1 wt %-2-propanol solution was prepared in the same manner as in Example 1 using, as a photochromic compound, 4,4',4"-tris (dimethylamino)triphenylmethan (LCV) in place of BLMB.

The obtained photochromic solution (LCV-1 wt % 2-propanol solution) was introduced into a batch-type γ-ray irradiation device. The photochromic solution was irradiated with γ-rays of 1.4 to 8.7 kGy. Thereafter, the absorbance at 400 to 700 nm was measured by an absorptiometer (UV-1700, manufactured by Shimadzu Corp.), and the relationship between the γ-ray dose (Gy) and the absorbance (Abs. area) was analyzed.

Figure 4:
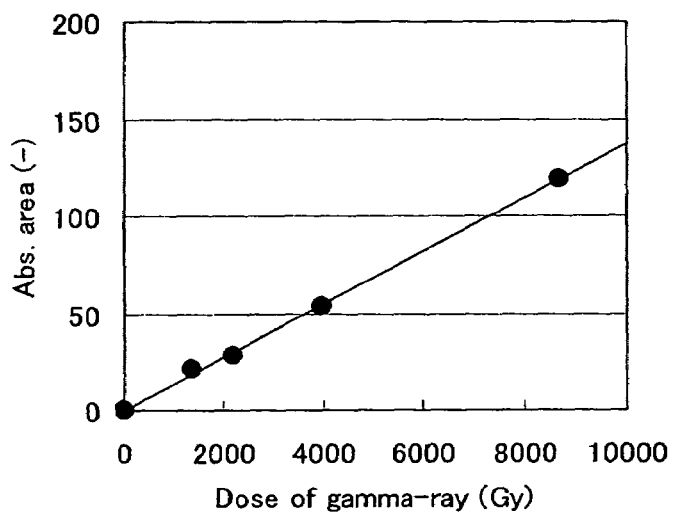
FIG. 4 is a graph illustrating the relationship between the absorbed γ-ray dose (Gy) and the absorbance area (Abs. area) at 400 to 700 nm of a photochromic solution (LCV-1 wt %-2-propanol solution) obtained in Example 3.

The results are shown in FIG. 4.

As is clear from the results shown in FIG. 4, the absorbance of the photochromic solution (LCV-1 wt % 2-propanol solution) linearly increases with increase in the γ-ray dose, and a high correlation was observed between the γ-ray dose and the absorbance.

Further, using the above-mentioned photochromic solution (LCV-1 wt % toluene solution), LCV radiation dosimeters each formed of a microcapsule in which the photochromic solution was an LCV-1 wt % toluene solution and the capsule film material was a urea-formaldehyde resin were prepared in the same manner as in Example 1. The particle diameter distribution of the microcapsules produced by the method was 1.0 to 35 μm (90% value).

Example 4

Preparation of BLMB Microcapsule (BLMB Ultraviolet Ray Dosimeter)

BLMB ultraviolet ray dosimeters each formed of a microcapsule containing a photochromic solution having an average particle diameter of 5 μm were prepared in the same manner as in Example 1.

The obtained BLMB ultraviolet ray dosimeters were fractionated through nylon mesh sieves having sieve openings of 40 μm and 10 μm (tradename: NY-20HC, manufactured by NYTAL) using a sorting function of a flow cytometer to thereby obtain fractionated BLMB ultraviolet ray dosimeters (BLMB ultraviolet ray dosimeter of Example 4).

The particle diameter distribution of the BLMB ultraviolet ray dosimeters before the fractionation was 1.0 to 45 μm (90% value), and the particle diameter distribution of the BLMB ultraviolet ray dosimeter after the fractionation (BLMB ultraviolet ray dosimeter of Example 4) was 1 to 7 μm (90% value).

The BLMB ultraviolet ray dosimeters before and after the fractionation were measured for the histogram of the forward scattered light of the BLMB ultraviolet ray dosimeters using a flow cytometer.

Figure 5:
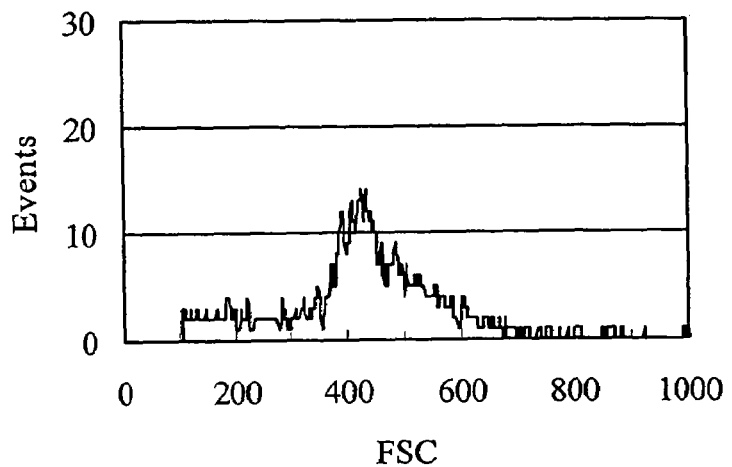
FIG. 5 is a graph illustrating the relationship between the FS channel of a BLMB ultraviolet ray dosimeter before fractionation obtained in Example 4 and the number of particles (discrete value) in each channel.
Figure 6:
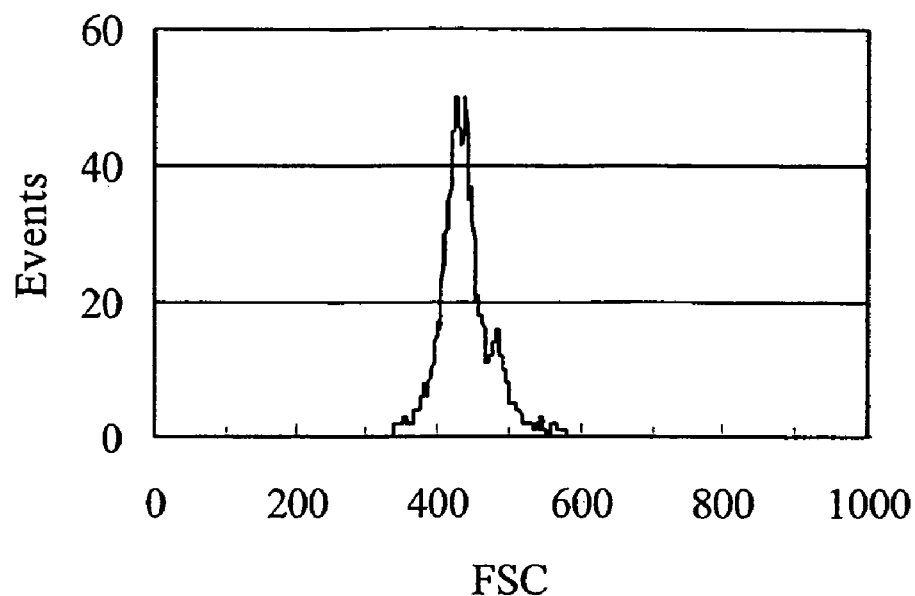
FIG. 6 is a graph illustrating the relationship between the FS channel of the BLMB ultraviolet ray dosimeter after fractionation obtained in Example 4 and the number of particles (discrete value) in each channel.

The results of the BLMB ultraviolet ray dosimeters before the fractionation are as shown in FIG. 5 and the results of the BLMB ultraviolet ray dosimeters after the fractionation are as shown in FIG. 6. By the fractionation using the sorting function of a flow cytometer, the half band width of the forward scattered light histogram in the BLMB ultraviolet ray dosimeters before the fractionation was successfully adjusted to about 1/10 after the fractionation.

The BLMB ultraviolet ray dosimeters (BLMB ultraviolet ray dosimeters after the fractionation) thus obtained of Example 4 were introduced into a batch-type ultraviolet ray irradiation device in the same manner as in Example 1, and were irradiated with low energy ultraviolet rays of 20 to 100 mJ/cm$^2$. Thereafter, the side scattered light (SSC) was measured with a flow cytometer, and the relationship between the ultraviolet ray dose (mJ/cm$^2$) and the side scattered light (ssc) was analyzed.

Figure 7:
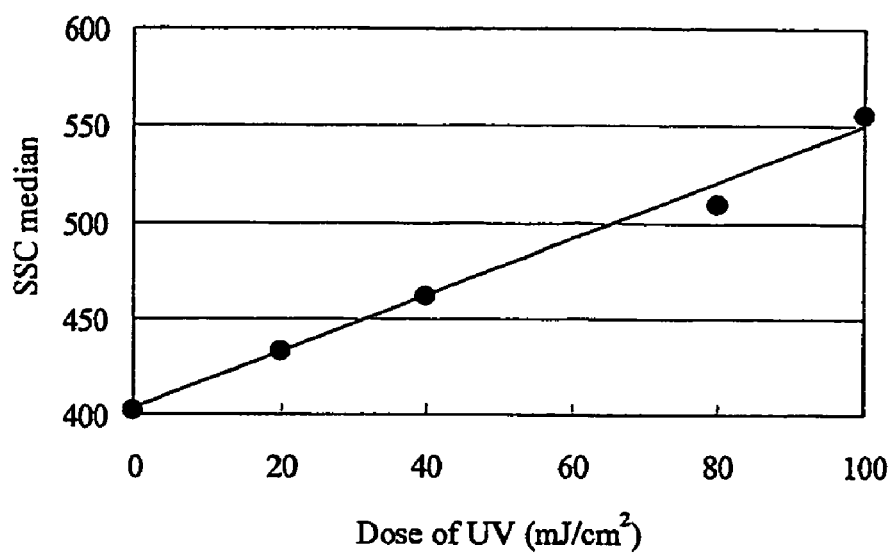
FIG. 7 is a graph illustrating the relationship between the ultraviolet ray dose (mJ/cm$^2$) and the median of the SS channel of the BLMB ultraviolet ray dosimeter after fractionation obtained in Example 4.

The results are shown in FIG. 7.

Considering the fact that the half band widths of the histogram of the side scattered light in the BLMB ultraviolet ray dosimeters (BLMB ultraviolet ray dosimeters after the fractionation) of Example 4 obtained from FIG. 7 were 10 channels and the median of the histogram of the side scattered light increased by 150 channels by 100 mJ/cm$^2$ irradiation, the ultraviolet ray dose per channel of the side scattered light was 0.67 mJ/cm$^2$, and the resolution of the BLMB ultraviolet ray dosimeters of Example 4 was calculated to be 7 mJ/cm$^2$.

The similarly obtained resolution of the BLMB ultraviolet ray dosimeters before the fractionation was calculated to be 70 mJ/cm$^2$.

[Measurement of Color Change Level of BLMB Microcapsule (BLMB Ultraviolet Ray Dosimeter)]

Next, 10$^5$/ml of BLMB ultraviolet ray dosimeters prepared in Example 4 were added to purified water to prepare a sample water (OD254 nm=0.11). 30 ml of the sample water was put in each of two 36 mmφ plastic bottles to thereby prepare two measurement samples.

With respect to the two measurement samples, one measurement sample was not stirred and irradiated with ultraviolet rays in a static system in such a manner that the ultraviolet ray dose on the surface of a water layer was adjusted to 50 mJ/cm$^2$ with a batch-type ultraviolet ray irradiation device. The other sample water was mixed under 100 rpm conditions using a magnetic stirrer and irradiated with ultraviolet rays in a completely mixed system in such a manner that the ultraviolet ray dose on the surface of a water layer was adjusted to 50 mJ/cm$^2$ with a batch-type ultraviolet ray irradiation device. After the irradiation of ultraviolet rays, the BLMB ultraviolet rays dosimeters were collected. Then, the side scattered light (SSC) was measured with a flow cytometer, and the color change level of each BLMB ultraviolet ray dosimeter was calculated from the histogram.

Figure 8:
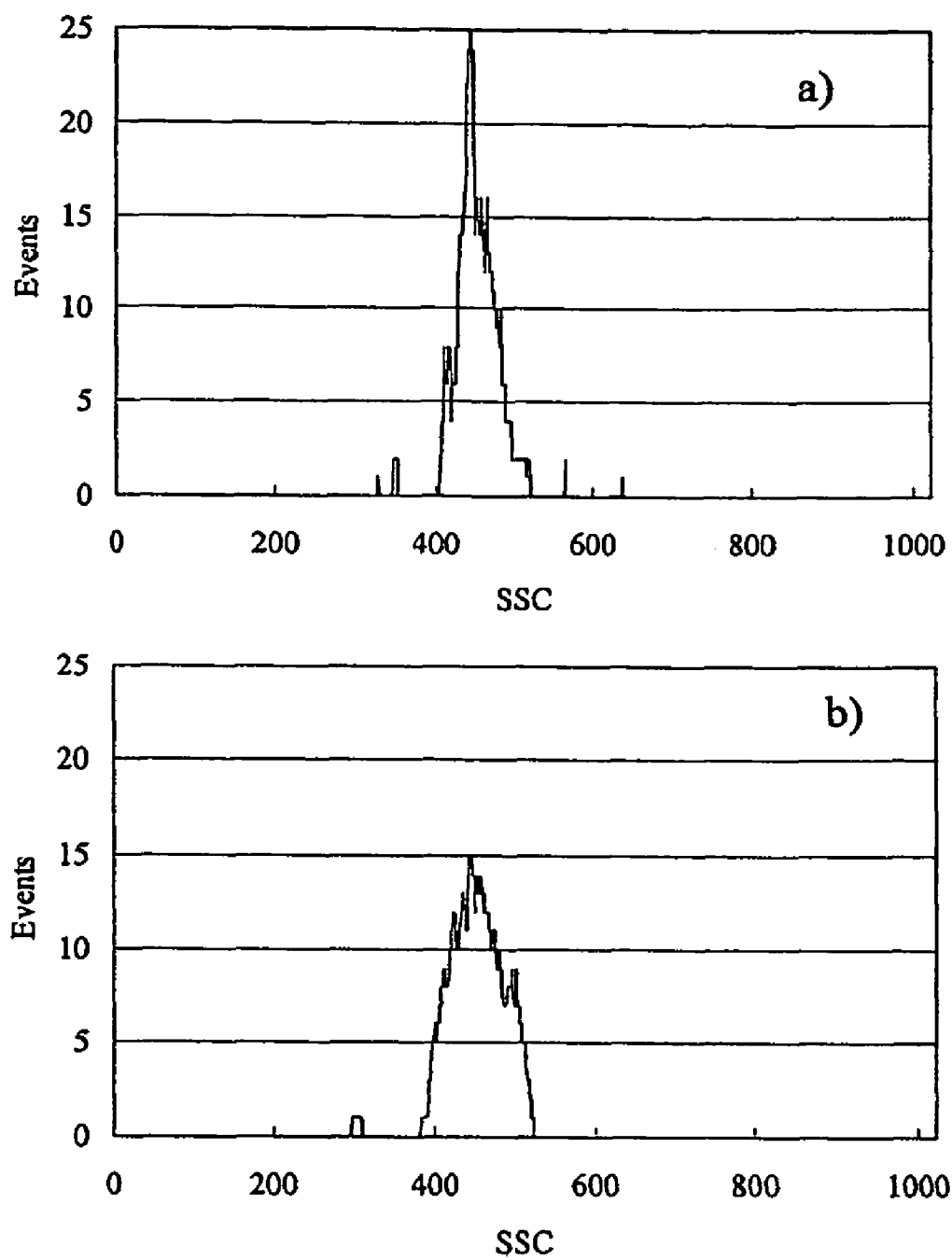
FIG. 8 is a graph illustrating the relationship between the SS channel and the number of events (Events) when the BLMB ultraviolet ray dosimeter after fractionation obtained in Example 4 is irradiated with ultraviolet rays.

The measurement results of the color change level by the irradiation of ultraviolet rays in the completely mixed system are shown in FIG. 8 (a) and the measurement results of the color change level by the irradiation of ultraviolet rays in the static system are shown in FIG. 8(b).

As is clear from the histograms shown in FIGS. 8(a) and 8(b), when ultraviolet ray irradiation was performed in the completely mixed system, the dose of ultraviolet rays with which each BLMB ultraviolet ray dosimeter was irradiated became uniform, and thus a sharp histogram was obtained (see FIG. 8(a)). In contrast, when ultraviolet ray irradiation was performed in the static system, the ultraviolet rays were attenuated from the surface to the bottom of the water layer according to the Lambert-beer law, and the distribution arose in the dose of ultraviolet rays with which each BLMB ultraviolet ray dosimeter was irradiated (calculated value when the ultraviolet ray dose on the surface of the water layer was adjusted to 50 mJ/cm²:50 to 23 mJ/cm²), resulting in that a relatively broad histogram was obtained (see FIG. 8(b)).

Moreover, when the average ultraviolet ray dose was calculated from the median of the histogram, the average ultraviolet ray dose in the mixed system was 35 mJ/cm² and the average ultraviolet ray dose in the static system was 33 mJ/cm². In both the mixed system and the static system, especially in the mixed system, the average ultraviolet ray dose well agreed with the calculated value (35 mJ/cm²).

The measurement results of the color change level after the irradiation of ultraviolet rays showed that the ultraviolet ray dose distribution can be determined with the BLMB ultraviolet ray dosimeters of Example 4.

INDUSTRIAL APPLICABILITY

According to the radiation dosimeter for fluid very small substances and the method of measuring the radiation dose using the same of the present invention, in a radiation irradiation device which introduces a fluid into a treatment chamber, irradiates the fluid with radiation in the treatment chamber to thereby irradiate the fluid very small substances in the fluid with radiation, the dose distribution and/or the minimum dose of radiation with which each fluid very small substances has been irradiated can be easily and accurately determined. Therefore, in a radiation irradiation device for irradiating with radiation such as ultraviolet rays, X-rays, γ-rays, and electron beams (β-rays) for killing and inactivating various pathogenic microorganisms which exist or are generated in a fluid to be treated in the technical fields such as the water treatment industries and which flow with the movement of the fluid (e.g., water and sewerage systems), the food industries, and the pharmaceutical industries and which flow with the movement of the fluid, the dose distribution and/or the minimum dose of radiation with which each fluid very small substance (pathogenic microorganism) is actually irradiated can be easily and accurately estimated, which is very useful for designing the structure and the formation of the radiation irradiation device and determining the operation conditions and management conditions.

The invention claimed is:

1. A radiation dosimeter for fluid very small substances, comprising a microcapsule which comprises
   a radiation transmitting shell body and
   a photochromic solution obtained by dissolving a radiation color development tautometric photochromic compound in a solvent and contained in the shell body and which undergoes a change in color when the photochromic solution undergoes a change in color by irradiation of radiation; wherein
   a radiation dose and a color change level of the microcapsule have a quantitative relationship; and
   a particle diameter showing a peak value in a particle diameter distribution of the microcapsules is adjusted to be substantially the same as a dimension diameter of the fluid very small substance serving as a dose measurement target.

2. A radiation dosimeter for fluid very small substances according to claim 1, wherein the microcapsule has a particle diameter R in a range of $0.5r \leq R \leq 1.5r$ relative to a dimension diameter r of the fluid very small substance serving as a dose measurement target.

3. A radiation dosimeter for fluid very small substances according to claim 1 or 2, wherein the radiation comprises ultraviolet rays or radioactive rays.

4. A radiation dosimeter for fluid very small substances according to claim 1, wherein the photochromic solution has an irreversible color change property with which the photochromic solution does not decolorize by irradiation of visible rays and/or heating after the photochromic solution has undergone a change in color upon the irradiation of radiation.

5. A radiation dosimeter for fluid very small substances according to claim 1, wherein the photochromic solution is a 0.01 to 2 wt % toluene solution of 10-benzoyl-N,N,N',N'-tetramethyl-10H-phenothiazine-3,7-diamine (BLMB) or a 0.01 to 2 wt % toluene solution of 4,4',4"-tris(dimethylamino)triphenylmethan (LCV).

6. A radiation dosimeter for fluid very small substances according to claim 1, wherein the radiation transmitting shell body is formed of any one of capsule film materials selected from gelatin, a urea resin, a melamine resin, a urethane resin, and a polyurea resin.

7. A radiation dosimeter for fluid very small substances according to claim 6, wherein the capsule film material is a urea-formaldehyde resin.

8. A radiation dosimeter for fluid very small substances according claim 1, wherein the fluid very small substance is *Cryptosporidium* which is a pathogenic microorganism having a dimension diameter of 4 to 7 μm and generated in potable water, and a particle diameter R of the microcapsule is 3 to 8 μm.

9. A radiation dosimeter for fluid very small substances according to claim 1, wherein the fluid very small substance is *Giardia* which is a pathogenic microorganism having a dimension diameter of 8 to 12 μm and generated in potable water, and a particle diameter R of the microcapsule is 6 to 14 μm.

10. A method of measuring a radiation dose to fluid very small substances, comprising measuring a dose of radiation with which fluid very small substances have been irradiated by a radiation dosimeter in a radiation irradiation device which introduces a fluid into a treatment chamber equipped with a radiation irradiation means and irradiates the fluid with radiation in the treatment chamber by the radiation irradiation means to thereby irradiate the fluid very small substances in the fluid; wherein the radiation dosimeter comprises a microcapsule which comprises a radiation transmitting shell body and a photochromic solution obtained by dissolving a radiation color development tautometric photochromic compound in a solvent and contained in the shell body;

the microcapsule undergoes a change in color upon a change in color of the photochromic solution by irradiation of radiation;

in the microcapsule, a color change level thereof has a quantitative relationship with a radiation dose; and measuring a color change level of each radiation dosimeter collected from an outlet of the treatment chamber, the radiation dosimeter being introduced into the treatment chamber of the radiation irradiation device from an inlet port of the treatment chamber, and determining a dose distribution and/or a minimum dose of radiation with which each fluid very small substance has been irradiated by the radiation irradiation means.

11. A method of measuring a radiation dose to fluid very small substances according to claim 10, wherein the microcapsule forming the radiation dosimeter has a structure in which a particle diameter showing a peak value in a particle diameter distribution of the microcapsules is adjusted to be substantially the same as a dimension diameter of the fluid very small substance serving as a dose measurement target.

12. A method of measuring a radiation dose to fluid very small substances according to claim 11, wherein the microcapsule forming the radiation dosimeter has a particle diameter R in a range of $0.5r \leqq R \leqq 1.5r$ relative to a dimension diameter r of the fluid very small substance serving as a dose measurement target.

13. A method of measuring a radiation dose to fluid very small substances according to any one of claims 10 to 12, wherein the fluid comprises potable water or a fluid foodstuff;

the radiation comprises ultraviolet rays; and the fluid very small substance comprises a pathogenic microorganism which is generated in the fluid foodstuff.

14. A method of measuring a radiation dose to fluid very small substances according to claim 10, wherein the fluid comprises potable water; and the fluid very small substance comprises *Cryptosporidium* and/or *Giardia* which are/is generated in the potable water.

15. A method of measuring a radiation dose to fluid very small substances according to claim 10, wherein the color change level of the radiation dosimeters collected from the outlet of the treatment chamber is measured for each radiation dosimeter using a flow cytometer.

* * * * *